United States Patent
Rüger et al.

[11] Patent Number: 5,396,872
[45] Date of Patent: Mar. 14, 1995

[54] FUEL TANK WITH A SUBTANK

[75] Inventors: Ernst Rüger, Taufkirchen; Gerhard Geyer; Martin Kling, both of Munich, all of Germany

[73] Assignee: Robert Bosch GmbH, Stuttgart, Germany

[21] Appl. No.: 193,151

[22] PCT Filed: May 19, 1993

[86] PCT No.: PCT/DE93/00438
§ 371 Date: Feb. 14, 1994
§ 102(e) Date: Feb. 14, 1994

[87] PCT Pub. No.: WO93/25403
PCT Pub. Date: Dec. 23, 1993

[30] Foreign Application Priority Data

Jun. 13, 1992 [DE] Germany .................. 42 19 516.0

[51] Int. Cl.⁶ ..................... F02M 37/10; B60K 15/03
[52] U.S. Cl. ..................... 123/514; 137/574
[58] Field of Search ............ 123/509, 514, 497; 137/566, 592, 573, 574, 576

[56] References Cited

U.S. PATENT DOCUMENTS

| | | | |
|---|---|---|---|
| 2,953,156 | 9/1960 | Bryant | 137/571 |
| 4,838,307 | 6/1989 | Sasaki et al. | 123/514 |
| 5,070,849 | 12/1991 | Rich et al. | 123/509 |
| 5,133,324 | 7/1992 | Michiaki | 123/514 |
| 5,170,764 | 12/1992 | Tuckey | 123/509 |
| 5,289,810 | 3/1994 | Bauer et al. | 123/514 |

FOREIGN PATENT DOCUMENTS

| | | |
|---|---|---|
| 2639405 | 5/1990 | France . |
| 3915185 | 4/1990 | Germany . |

*Primary Examiner*—Willis R. Wolfe
*Assistant Examiner*—Thomas N. Moulis
*Attorney, Agent, or Firm*—Michael J. Striker

[57] ABSTRACT

The description relates to a fuel tank serving to provide fuel to the internal combustion engine of a motor vehicle. The fuel tank contains a vessel arranged therein, from which vessel a delivery unit pumps fuel to the internal combustion engine of a motor vehicle and in which are arranged a plurality of jet pumps for filling the vessel, which jet pumps are connected to a line system which is charged with fuel by the delivery unit, the mixing tubes of the jet pumps opening out into the vessel. A reliable filling of the vessel with fuel is ensured in spite of the compact construction even when the tank is almost empty and under unfavorable operating conditions in that jet pumps connected in parallel to the line system are arranged at a common structural member and in that a suction line leads to each mixing tube, the openings of these suction lines remote of the structural member being situated in the tank at a distance from one another.

16 Claims, 2 Drawing Sheets

FUEL TANK WITH A SUBTANK

PRIOR ART

The invention is based on a fuel tank according to the generic part of the main claim. In a fuel tank which is already known from DE-PS 39 15 185, two jet pumps supplied by the fuel return line are arranged in a fuel tank having two partial tanks which are situated at a distance from one another and connected with one another at a distance above the base of the fuel tank. To ensure a reliable emptying of the two partial tanks, one jet pump is located in each partial tank. Both jet pumps fill a tank or vessel which is arranged in one partial tank, a fuel delivery unit sucking the fuel out of this vessel. However, this is ensured only under normal operating conditions.

ADVANTAGES OF THE INVENTION

In contrast to the prior art, the fuel tank according to the invention with the characterizing features of the main claim has the advantage that it ensures a reliable supply of fuel to the fuel delivery unit even under disadvantageous operating conditions.

Such operating conditions can occur, for example, when the tank is almost empty and the motor vehicle must travel a relatively long distance downhill or uphill. Such unfavorable conditions can also occur when the motor vehicle must travel a relatively long curve when the tank is almost empty. Under such circumstances, the remaining fuel slops against one edge region of the fuel tank so that the jet pumps may no longer be able to access and deliver fuel and the vessel is quickly emptied. Such a process can have fatal consequences.

Advantageous further developments and improvements of the fuel tank set forth in the main claim are made possible by the steps contained in the subclaims.

DRAWING

Embodiment examples of the invention are shown in the drawing and described in more detail in the following description.

DESCRIPTION OF THE EMBODIMENT EXAMPLES

Figure 1:
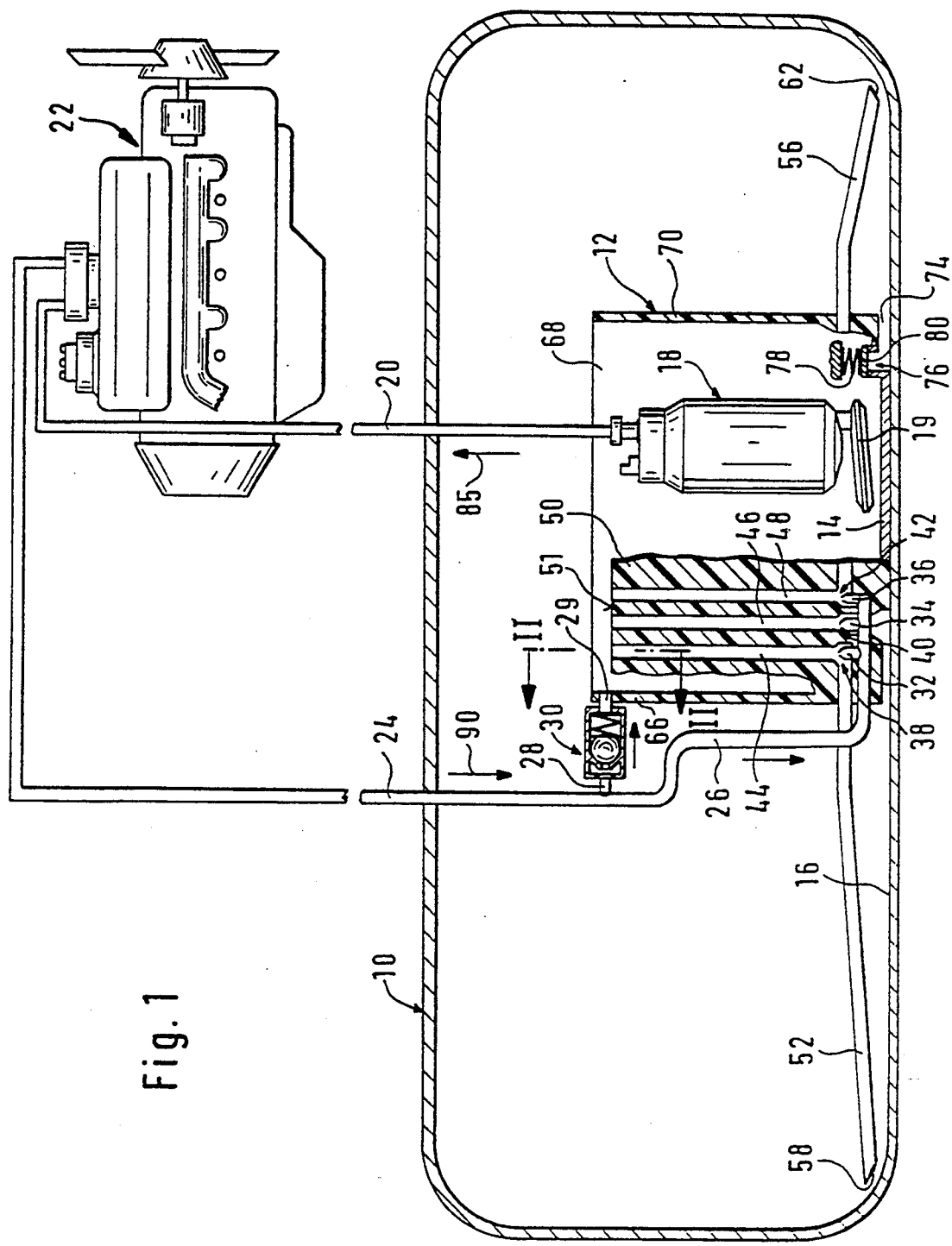
FIG. 1 shows a basic view (not in scale) of a fuel supply apparatus for the internal combustion engine of a motor vehicle with fuel supply tank, shown in section, a vessel arranged in the latter, shown in section, a fuel delivery unit, and a line system connecting the tank with the internal combustion engine.
Figure 2:
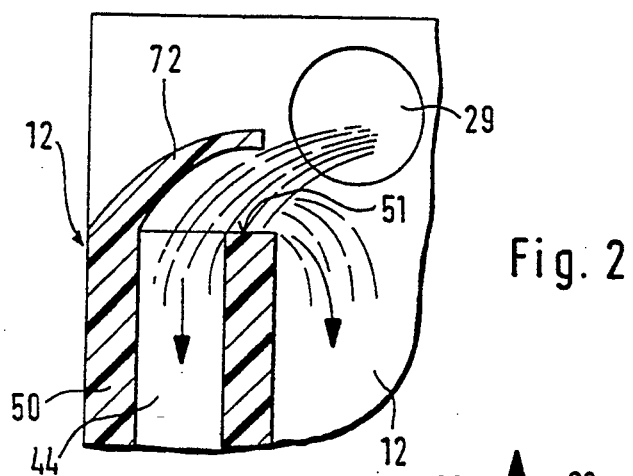
FIG. 2 shows a partial section through the vessel along line II—II in FIG. 1 in enlarged scale.
Figure 3:
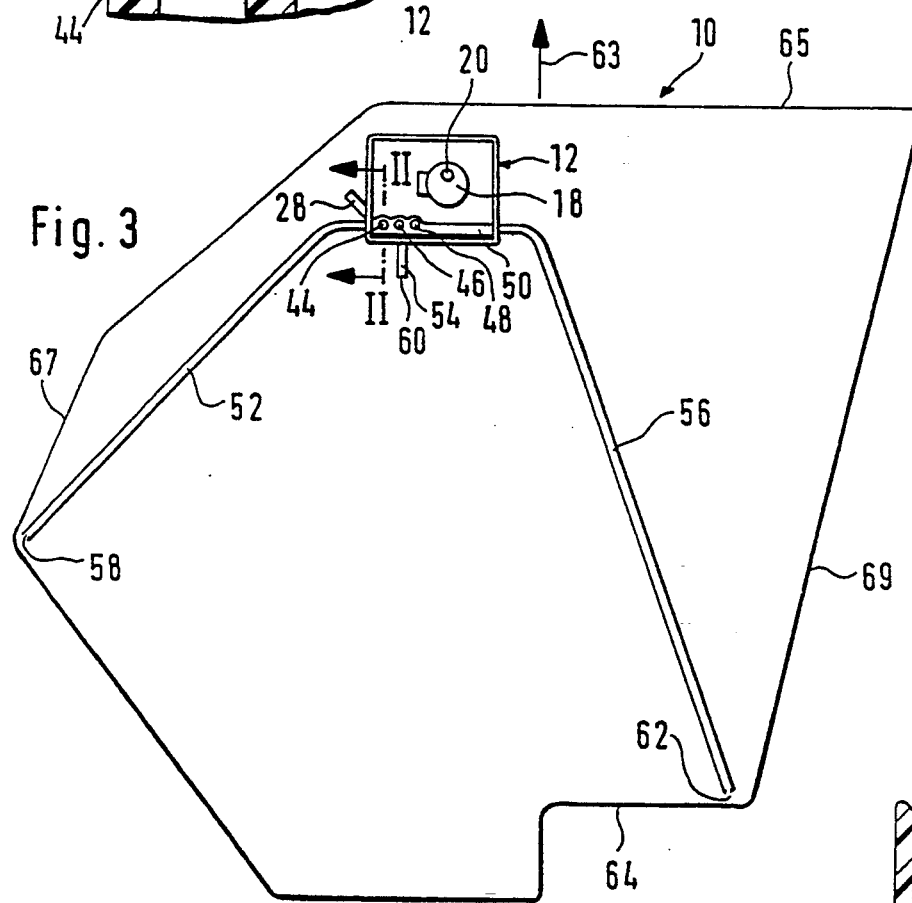
FIG. 3 shows a top view of the fuel supply tank, shown in reduced scale, with the upper wall of the tank removed.

A fuel supply tank 10 shown in FIG. 1 is provided in its interior with a vessel 12 whose base 14 resists on the bottom 16 of the fuel supply tank 10. A fuel delivery unit 18 is arranged in the vessel 12. The fuel delivery unit 18 sucks fuel out of the interior of the vessel 12 and delivers it, via a supply line 20, to an internal combustion engine 22 of a motor vehicle (not shown in more detail). Since the delivery unit delivers more fuel to the internal combustion engine 22 than can be consumed by the latter, a certain excess amount of fuel is returned to the fuel supply tank 10 via a return line 24. The return line 22 is divided within via a return line 24. The return line 22 is divided within the fuel supply tank 10 into a supply line 26 for jet pumps, which will be described in more detail in the following, and a bypass 28 which leads directly into the vessel 12 via a relief valve 30. As will further be seen from FIG. 1, three fuel nozzles 32, 34, 36 associated in each instance with a jet pump 38, 40, 42 are constructed at the end portion of the supply line 26. Mixing tubes 44, 46 and 48 associated with the fuel nozzles 32, 34, 36 are constructed in one side wall 50 of the vessel 12. The fuel nozzles 32, 34, 36 are also constructed in side wall 50. Only a fragment of the side wall 50 is shown in section in FIG. 1. This fragment reveals the upright arrangement of the jet pumps 38, 40, 42 whose mixing tubes 44, 46, 48 open out at the upper edge area of the side wall 50. The wall 50 of the vessel 12 thus forms a structural member at which the three jet pumps 38, 40, 42 are arranged or integrated therewith. Each jet pump 38, 40, 42 is provided with a suction line 52, 54, 56 (FIG. 3) through which the delivered fuel reaches the mixing area of the jet pumps 38, 40, 42 which surrounds the fuel nozzles 32, 34, 36. The suction lines 52, 54, 56 are guided in such a way that their openings 58, 60, 62 remote of the vessel wall 50 are at a distance from one another. This is shown particularly clearly in FIG. 3, in which it can further be seen that the openings 58 and 62 are arranged in the region of the two opposite side regions of the tank 10. The side region is understood by reference to the driving direction of the motor vehicle which is shown in FIG. 3 by an arrow 63. FIG. 3 also shows that one of the openings 62 is located in the region of the rear wall 64 of the fuel supply tank 10 with reference to the driving direction (arrow 63). The third suction line 54 associated with the center jet pump 34 situated between the two jet pumps 38 and 42, has an opening 60 located in the front region of the fuel supply tank 10. As is further shown in FIG. 1, the wall 50 of the vessel 12 is somewhat lower than the other three side walls 66, 68, 70. The side wall 66 includes bypass 28 with check valve 30. The opening 29 of the bypass on the vessel side, with reference to the base 14 of the vessel, is situated above the upper edge 51 of the vessel wall 50. Accordingly, the opening 29 also lies above the openings of the mixing tubes 44, 46 and 48. The bypass line 28 is so aligned that its opening 29 is directed toward the openings of the mixing tubes 44, 46, 48 at the upper edge 51 of the wall. As is shown in FIG. 2, a deflecting plate or guide shoulder 72 extends from the outside of the vessel wall 50 over the opening of the mixing tube 44 shown in section. Such a design is provided for each mixing tube 44, 46, 48. These shoulders 72 can be formed for all mixing tubes by an individual shoulder 72. The shoulder 72 extends at least far enough toward the opening 29 of the bypass line 28 so as to cover the mixing tubes 44, 46, 48 at a distance from their openings. Finally, FIG. 1 shows that the vessel 12 has an offset 74 relative to the tank bottom 14. In this offset region 74, the vessel bottom 14 has a check valve 76 whose closing spring 78 holds the closing member 80 in the closed position with a minimum force.

Figure 4:
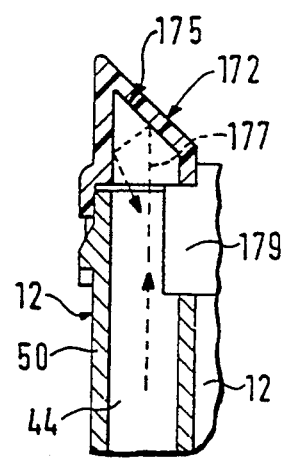
FIG. 4 shows a partial section according to FIG. 2 through a modified construction of the vessel.

The operation of the fuel supply apparatus will now be described. During operation of the internal combustion engine 22, the delivery unit 18 delivers fuel from the vessel 12 to the internal combustion engine 22 via the supply line 20. Roughly one half of the fuel delivered by the delivery unit (indicated by an arrow 85 in FIG. 1) is consumed by the internal combustion engine 22. The remaining 50% flows back into the tank 12 as surplus (shown by arrow 90) via the return line 24. In so doing, this returning flow is divided into two parts, one part being supplied to the jet pumps 38, 40, 42 via the supply line 26, while the fuel not needed by these jet pumps builds up excess pressure in the return line 24 which causes the relief valve 30 in the bypass 28 to open. The fuel not required by the jet pumps 38, 40, 42 is accordingly guided directly into the vessel 12, exits via the opening 29 of the bypass line 28, and is deflected by the shoulder 72 of the wall 50 and guided into the mixing tubes 44, 46, 48. This is particularly important when the mixing tubes 44, 46, 48 are drained via the suction lines 52, 54 and 56 when starting the internal combustion engine. A rapid filling of the mixing tubes and accordingly a rapid establishment of the pumping action of the jet pumps 38, 40 and 42 is achieved in that the mixing tubes 44, 46 and 48 are filled from above via the bypass line 28. The shoulder 72 serves the same function in that medium which is sprayed up via the fuel nozzles 32, 34, 36 is guided back into the mixing tubes 44, 46, 48 at least in part by the deflecting action of the shoulder 72. FIG. 4 shows an alternative design to that shown in FIG. 2. In FIG. 4, a cap 172, instead of the shoulder 72 (FIG. 2), is fitted to the mixing tube 44. The roof-like deflecting slope of the cap 172 deflects the jet generated by the jet pump 38 as is illustrated by the dashed line 177. This ensures a rapid filling of the mixing tube 44. A side window 179 allows the delivered fuel to enter the vessel 12.

Due to the check valve 76, the suction side 19 of the fuel pump 18 is already supplied with a small amount of fuel when first filling the tank or after the tank has run dry, so that the internal combustion engine can be started.

Further, the shoulder 72 or outside of the deflecting slope 175 allows the fuel emerging from the opening 29 to drain into the interior of the vessel 12 so that the greater part of the remaining fuel supplied to the vessel via the return line 24 reaches the vessel 12 and is available to the fuel delivery unit 18. This is particularly important when the fuel tank 10 is only filled to a minimum and the motor vehicle must travel over a long incline or decline. In this case, the fuel remaining in the tank 10 slops either toward the rear into the region of the rear wall 64 or toward the front to the front wall 65 of the tank 10. In either case, it reaches the opening 62 of the suction line 56 or the opening 60 of the suction line 54. Thus, a reliable filling of the vessel 12 is ensured in either event, even under these unfavorable operating conditions. If the motor vehicle travels along an extended curve when the tank contains a minimum of fuel, the remaining fuel is pressed into the region of one of the side walls 67 or 69 where the openings 58 or 62 of the suction lines 52 or 56 are located. Accordingly, a reliable filling of the vessel 12 is ensured also under this unfavorable operating condition.

We claim:

1. A fuel tank, comprising a fuel tank body; a vessel arranged in said fuel tank body; a delivery unit operative for pumping fuel to an internal combustion engine of a motor vehicle from said vessel; a line system charged with fuel by said delivery unit; a plurality of jet pumps for filling said vessel, said jet pumps are connected to said line system and provided with mixing tubes opening out into said vessel; a common structural member on which said jet pumps connected with said line system are arranged in said vessel; and a plurality of suction lines each leading to a respective one of said mixing tubes and having openings which are remote from said structural member and located at a distance from one another in said tank member.

2. A fuel tank as defined in claim 1, wherein said vessel has a wall, said structural member being rigidly connected with said wall of said vessel.

3. A fuel tank as defined in claim 1, wherein said vessel has a wall, said structural member being formed as a part of said wall of said vessel.

4. A fuel tank as defined in claim 1, wherein said tank member has a tank base, said mixing tube of said jet pumps being arranged in said structural member in an upright position with reference to said tank base, said structural member having an upper edge region in which said mixing tubes of said jet pumps open out and also having a flow off leading into said vessel.

5. A fuel tank as defined in claim 1, wherein said line system has a line section which is divided in said structural member to form fuel nozzles of said jet pumps.

6. A fuel tank as defined in claim 1, wherein said suction line has suction tubes, at least some of said suction tubes having openings which are arranged in two side regions of said tank body with reference to a driving direction.

7. A fuel tank as defined in claim 6, wherein said tank body has a rear tank region, at least one of said openings being arranged in said rear tank region.

8. A fuel tank as defined in claim 6, wherein said suction line has an additional suction tube with an opening arranged in said rear tank region.

9. A fuel tank as defined in claim 1, wherein said jet pumps include three said jet pumps.

10. A fuel tank as defined in claim 1, wherein said line system has return lines leading from the internal combustion engine to said tank body, said jet pumps being located in a line section of one of said return lines.

11. A fuel tank as defined in claim 10; and further comprising a relief valve connecting said one return line directly to said vessel when said relief valve is opened, said relief valve being arranged in said return line prior to said jet pumps as considered in the direction of flow of fuel.

12. A fuel tank as defined in claim 11, wherein said mixing tubes of said jet pumps have openings; and further comprising a connecting line having an opening on a vessel side and leading from said relief valve to said vessel, said opening being arranged above said openings of said mixing tubes of said jet pumps and being directed toward said openings.

13. A fuel tank as defined in claim 1; and further comprising fuel deflecting members, said mixing tubes of said jet pumps on a vessel side being directed toward said deflecting members.

14. A fuel tank as defined in claim 1; and further comprising a cap with a deflecting slope and fitted to each of said mixing tubes so as to form a respective one of said deflecting members.

15. A fuel tank as defined in claim 14, wherein said caps for all said mixing tubes are formed as a common structural member.

16. A fuel tank as defined in claim 1, wherein said vessel has a base with an inlet opening provided with a check valve.

* * * * *